United States Patent [19]

Iizuka et al.

[11] 4,120,821

[45] Oct. 17, 1978

[54] CATALYST FOR CONVERSION OF ENGINE EXHAUST GAS

[75] Inventors: Akio Iizuka; Michiichi Taguchi, both of Yokohama; Muneyuki Kubo, Yokosuka, all of Japan

[73] Assignee: Nissan Motor Company, Limited, Japan

[21] Appl. No.: 713,788

[22] Filed: Aug. 12, 1976

[30] Foreign Application Priority Data

Aug. 28, 1975 [JP] Japan .................... 50-103415

[51] Int. Cl.² .................. B01J 21/02; B01J 23/56; B01J 8/02
[52] U.S. Cl. .................. 252/432; 250/466 PT; 423/213.5
[58] Field of Search .................. 252/432, 466 PT; 423/213.5

[56] References Cited

U.S. PATENT DOCUMENTS

| 3,840,471 | 10/1974 | Acres ................... 252/466 PT X |
| 3,856,705 | 12/1974 | McArthur ................... 423/213.5 X |
| 3,951,860 | 4/1976 | Acres et al. ................... 252/466 PT X |
| 3,972,831 | 8/1976 | Beuther et al. ................... 252/432 |

OTHER PUBLICATIONS

J. Chem. Soc. of Japan, vol. 84, #9, 1963 p. 17.

*Primary Examiner*—Delbert E. Gantz
*Assistant Examiner*—William G. Wright
*Attorney, Agent, or Firm*—Robert E. Burns; Emmanuel J. Lobato; Bruce L. Adams

[57] ABSTRACT

A catalyst, which has high and long-lasting activity on both the oxidation of hydrocarbons and carbon monoxide and the reduction of nitrogen oxides particularly when an internal combustion engine is operated at an air-fuel ratio around a stoichiometric ratio, consists of a carrier of active alumina, 0.05–0.2 Wt% platinum, 0.0015–0.045 Wt% rhodium and 0.002–5 Wt% boron.

15 Claims, 12 Drawing Figures

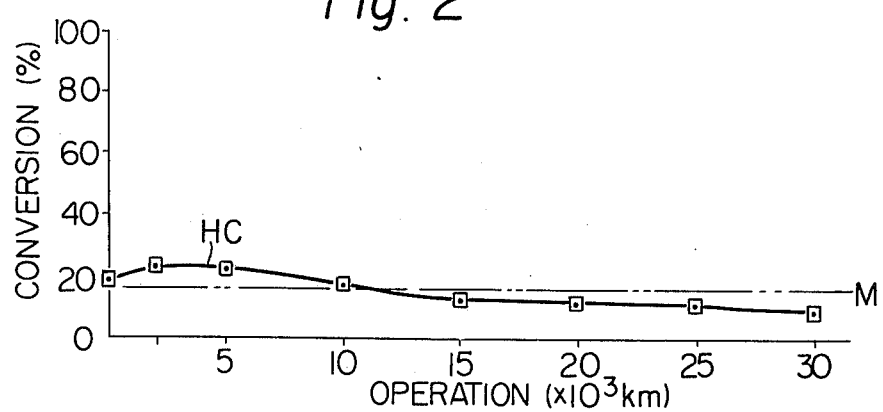
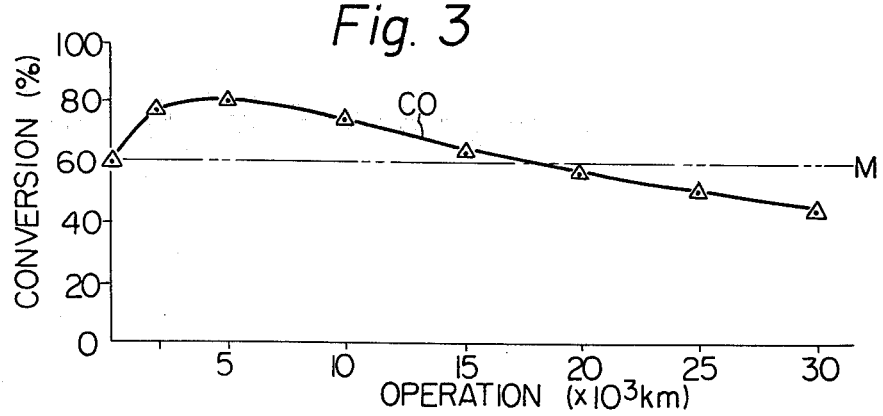
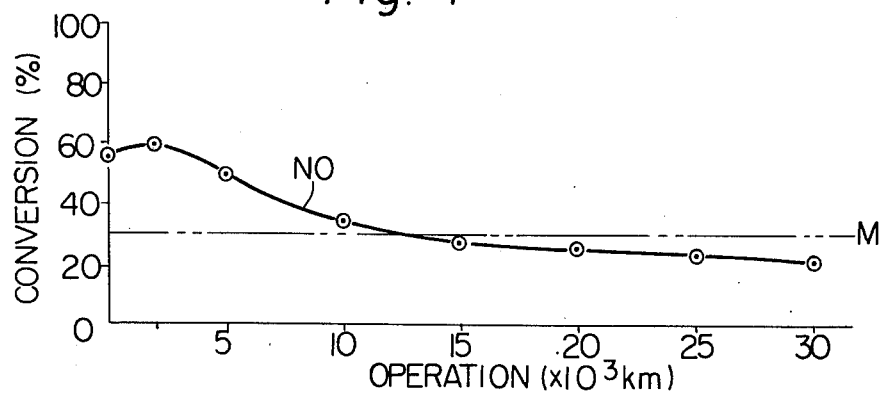

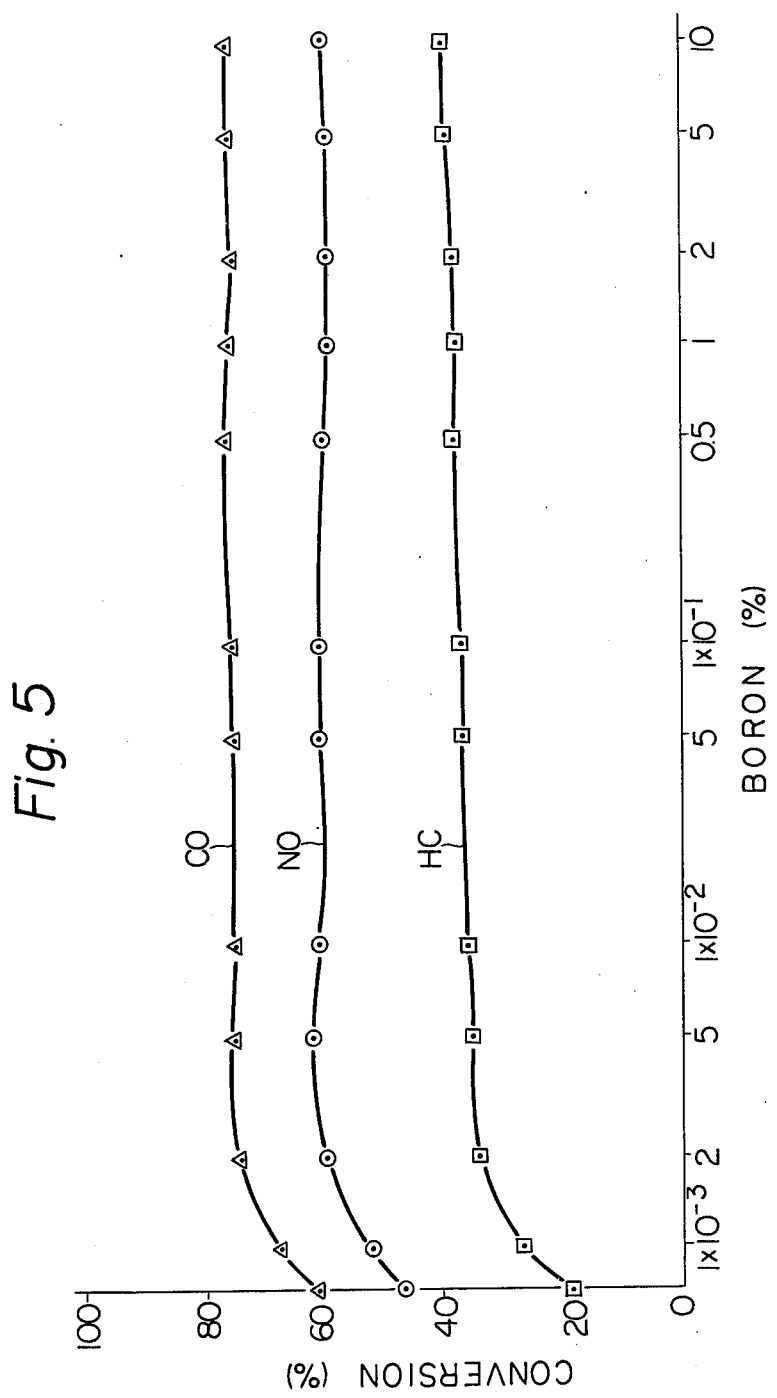

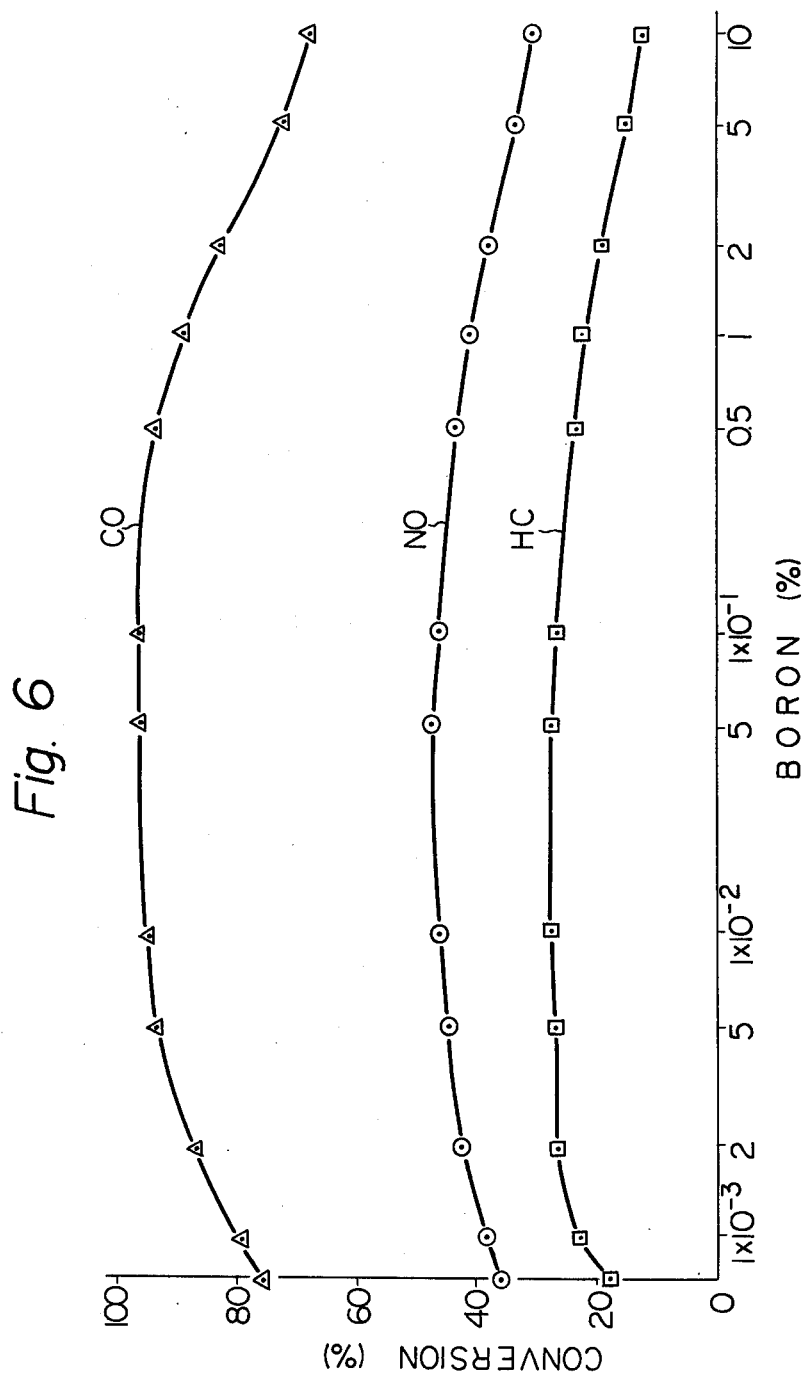

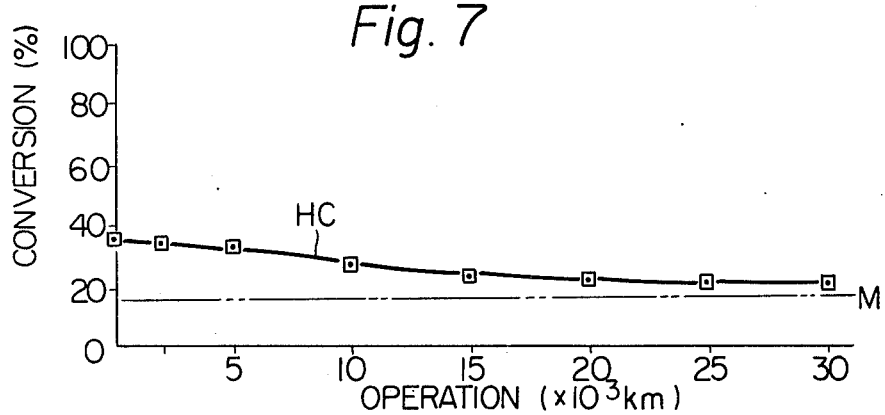
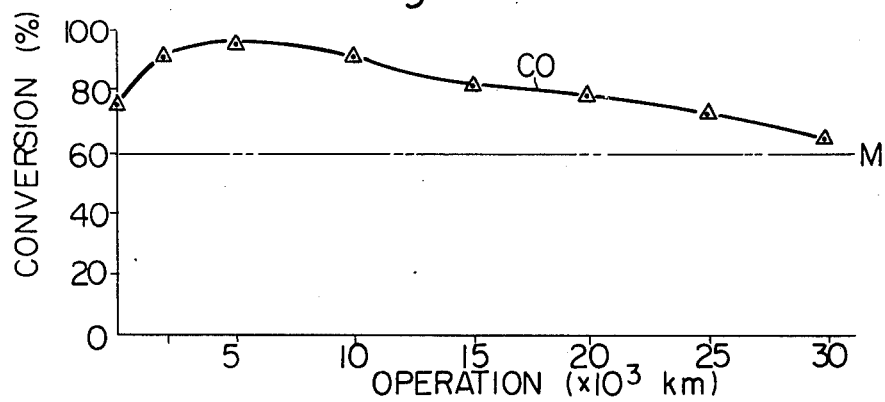
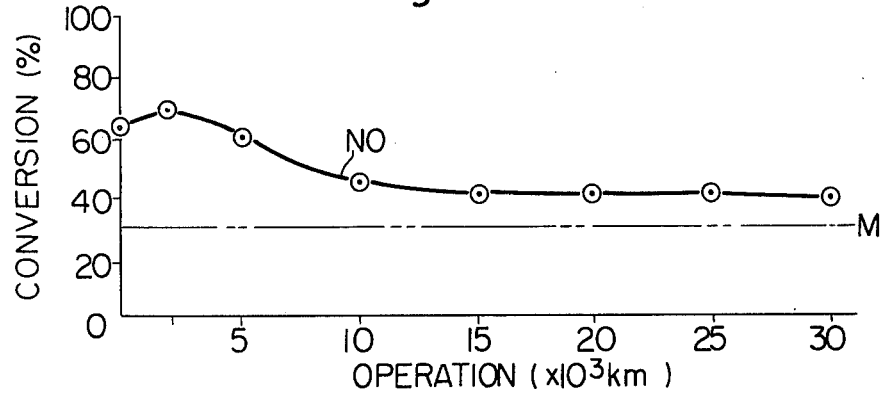

CATALYST FOR CONVERSION OF ENGINE EXHAUST GAS

FIELD OF THE INVENTION

This invention relates to a catalyst for simultaneously accomplishing the oxidation of hydrocarbons and carbon monoxide and the reduction of nitrogen oxides contained in exhaust gases of internal combustion engines. The catalyst is particularly useful in automotive engines which are operated with an air-hydrocarbon fuel mixture having an air-to-fuel ratio around the stoichiometric ratio.

BACKGROUND OF THE INVENTION

At present, exhaust gases of internal combustion engines still contribute to the air pollution although energetic endeavors have been made to solve this problem. Catalytic conversion of noxious or harmful components of the exhaust gases is considered as one of promising ways to the solution, so that various catalysts have been proposed and partly are in practical use. Most of the catalysts developed until now are only capable of promoting either the oxidation of hydrocarbons and carbon monoxide or the reduction of nitrogen oxides.

However, some recently developed catalysts are active simultaneously on the oxidation of hydrocarbons and carbon monoxide and on the reduction of nitrogen oxides if an engine exhaust gas at the entrance to a catalyst column contains oxidizing components and reducing components within a certain proportion range. In general, a catalyst of this type consists of a combination of two or more kinds of noble metals, particularly of platinum group metals exemplified by a combination of platinum and rhodium, applied to a carrier of an active or transition form alumina. As is commonly accepted, "active (or transition form) alumina" is the general term for gamma-, delta-, eta-, theta-, iota-, chi- and kappa-alumina including their mixtures. Accordingly, alpha-alumina and certain alumina hydrates are excluded from this definition. The catalysts of this type have satisfactorily good initial activity but are devoid of the ability of retaining their activity on continual exposure to engine exhaust gases for a long period of time. When these catalysts are used in automobiles, their activity significantly lowers after 10000-20000 km of vehicle operation. Accordingly these catalysts are not yet fully practicable.

A somewhat different catalyst is described in "J. Chem. Soc. of Japan", Vol. 84, No. 9 (1963), p. 17 as an acidic cracking catalyst. In the reported catalyst, platinum is applied to a carrier which contains 10-20% boria and is produced by impregnating alumina with boric acid and firing the impregnated alumina. We have examined the applicability of this catalyst to the conversion of engine exhaust gases with the result that the catalyst has not sufficiently high activity on the simultaneous conversion of hydrocarbons, carbon monoxide and nitrogen oxides and is very poor in the ability to retain its activity on continual exposure to engine exhaust gases.

THE INVENTION

It is an object of the present invention to provide a catalyst which has a high catalytic activity simultaneously on both the oxidation of hydrocarbons and carbon monoxide and the reduction of nitrogen oxides in the exhaust gas of an internal combustion engine, at least when the air-to-fuel ratio of a combustible mixture fed to the engine does not greatly deviate from the stoichiometric ratio, and can retain its activity for a long period of time even when continuously exposed to the exhaust gas.

A catalyst according to the invention consists essentially of a carrier at least a surface portion of which is substantially made of active alumina, 0.05-0.2 Wt% platinum, 0.0015-0.045 Wt% rhodium and 0.002-5 Wt% boron, the three elements being carried on the carrier.

The catalyst is produced preferably by wetting a carrier of, for example, gamma-alumina with an aqueous solution of chloroplatinic acid, rhodium chloride and boric acid, drying the wet carrier and finally baking at 400°-650° C. in a stream of steam and/or air.

The invention will be fully understood from the following detailed description of preferred embodiments with reference to the accompanying drawings, wherein:

FIGS. 2-4 are graphs showing the variations in the activity of the same catalyst upon continued exposure to the exhaust gas in terms of the conversion of hydrocarbons, carbon monoxide and nitrogen oxides, respectively;

FIG. 5 is a graph showing the effect of the addition of boron to a catalyst on the initial activity in the exhaust gas;

FIG. 6 is a similar graph but shows the activity after the maintenance of the catalyst in the exhaust gas for a certain period of time;

FIGS. 7-9 are graphs similar to the graphs of FIGS. 2-4, respectively, for a catalyst according to the invention;

As is known, the activity of a catalyst for conversion of hydrocarbons, carbon monoxide and/or nitrogen oxides in engine exhaust gases is affected by the proportion of oxidizing components to reducing components of the exhaust gas. In the description hereinafter, this proportion will be represented by a volumetric ratio designated as "L value" and defined by the following equation:

$$L \text{ value} = \frac{0.5 \, [NO] + [O_2]}{1.45 [HC] + 0.5 \, [CO] + 0.5 \, [H_2]}$$

where $[NO]$, $[O_2]$, $[HC]$, $[CO]$, and $[H_2]$ represent volumetric concentrations of the respective substances (HC means hydrocarbons) in the exhaust gas, on condition that the exhaust gas is produced by the combustion of a hydrocarbon fuel containing hydrogen atoms and carbon atoms at a ratio of 1.8:1.

We have produced a known catalyst (this catalyst will hereinafter be referred to as catalyst R: the production process will be described hereinafter) which consists of an alumina carrier, 0.09 Wt; (of the carrier) platinum and 0.03 Wt% rhodium in order to examine the dependence of its activity in engine exhaust gas on the L value and the amount of time maintained in the exhaust gas. The experiment was carried out at 300° C. by the use of gas mixtures of the following compositions as equivalents for engine exhaust gases.

| L value | 0.7 | 1.0 | 1.2 |
|---|---|---|---|
| CO | 0.72% | 0.55% | 0.50% |
| $CO_2$ | 13.7% | 14.05% | 14.20% |
| $H_2O$ | 10% | 10% | 10% |
| $H_2$ | 0.24% | 0.183% | 0.17% |
| HC | 1250 ppm | 1100 ppm | 1100 ppm |
| NO | 500 ppm | 500 ppm | 500 ppm |
| $O_2$ | 0.45% | 0.51% | 0.58% |
| $N_2$ | balance | balance | balance |

(HC was an ethylene-propane mixture at 3:2 molar ratio.)

When the L value is 1.0, the gas mixture corresponds to the combustion product of a stoichiometric air-HC mixture. Each gas mixture was passed through a catalyst column at a space velocity (volumes of gas per volume of catalyst per hour) of 55000 $hr^{-1}$.

Figure 1:
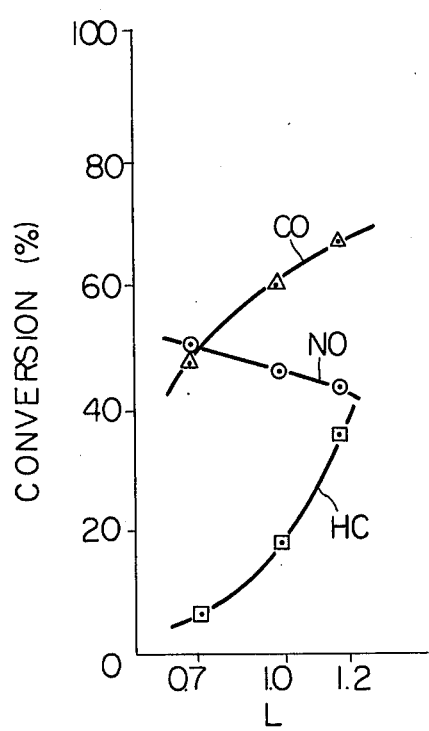
FIG. 1 is a graph showing the initial activity of a conventional catalyst in the exhaust gas of an internal combustion engine.

FIG. 1 shows the observed dependence of the initial activity of the catalyst R on the L value in terms of the conversion rate for each of HC, CO and NO.

The experiment was continued for hundreds of hours to evaluate the durability of catalyst. FIGS. 2–4 respectively show variations in the conversion rate for HC, CO and NO with the progress of the experiment maintaining L value at 1.0. The abscissa represents a total distance travelled by a motor vehicle carrying the catalyst, computed from the space velocity of the gas mixture and the amount of test hours, assuming a typical automotive engine. As seen in FIGS. 2–4, the activity of the catalyst R increase appreciably at an initial stage of the test where the catalyst in its fresh state was exposed to the hot gas mixture. Such an activation effect of exhaust gases is frequently observed on various exhaust conversion catalysts. However, the activity of the catalyst R soon commenced to continuously lower with the progress of the test, so that the conversion rate for each of HC, CO and NO fall below a minimum tolerance level, indicated by line M, after hours of exposure to the gas mixture equivalent to 10000–15000 km of vehicle operation.

We have discovered that both the initial activity and the ability of retaining the activity of a catalyst of this type can greatly be enhanced by the addition of a limited amount of boron to the conventional combination of platinum and rhodium. According to the invention, the amount of boron is limited to 0.002 Wt% of the active alumina carrier at the minimum and to 5 Wt% of the carrier at the maximum. Boron, preferably in the form of boric acid, must be applied to the carrier together with platinum and rhodium sources before a usual baking procedure, and the baking is preferably carried out at a relatively low temperature, for example at 400°–550° C. when performed in a stream of steam. As the result of the baking, boron, in a catalyst according to the invention, is considered to be present mostly in the form of boria, and at least a portion of boria is considered to be combined with alumina to form an alumina-boria system. The presence of boron and the baking at the relatively low temperature afford the catalyst an enhanced initial activity and strongly suppress the crystallization of platinum and rhodium during prolonged exposure of the catalyst to exhaust gases. Accordingly, the catalyst has a remarkably improved ability of retaining its activity in exhaust gases.

The amount of boron must not be less than 0.002 Wt% of the carrier to make the catalyst exhibit an acceptable level of conversion rate for each of hydrocarbons, carbon monoxide and nitrogen oxides. On the other hand, the presence of more than 5 Wt; (of the carrier) of boron hinders the catalyst from having a satisfactory durability. The maximum amount of boron is preferably limited to 0.5 Wt% of the carrier. In this respect, a carrier according to the invention is fundamentally different from the above referred cracking catalyst containing 10–20 Wt% boria in combination with alumina and platinum.

The catalyst according to the invention comprises platinum and rhodium respectively in 0.05–0.2 Wt% and 0.0015–0.045 Wt% of the carrier. These percentages are not particularly different from the values in conventional catalysts. As is known, both the initial activity and durability of the catalyst improve as the amounts of platinum and rhodium increase. However, the degree of the improvement diminishes when the amounts of these noble metals exceed certain levels. The upper limit values for platinum and rhodium, i.e. 0.2 Wt% and 0.045 Wt%, are specified from a consideration of such a tendency as well as the expensiveness of platinum and rhodium.

The carrier of a catalyst according to the invention is not different from alumina carriers for conventional catalysts. It is necessary that the carrier is made of active alumina, i.e. gamma-, delta-, eta-, theta-, iota-, chi- and/or kappa-alumina either entirely or at least in a portion including its surface.

The above described experiment on the conventional catalyst was followed by another experiment in which boron was added to the catalyst in various amounts. The experiment was performed under the following set of conditions: L value . . . . 1.0, space velocity 55000 $hr^{-1}$, temperature . . . 300° C. FIG. 5 shows the dependence of the initial activity of the catalyst on the amount of boron, and FIG. 6 shows the activity when the amount of the test hours reached a value approximately corresponding to 16000 km of vehicle operation. The graphs of FIGS. 5 and 6 were used as part of fundamental data for determining the above specified range (0.002–5 Wt%) of the boron content in the catalysts according to the invention.

As mentioned hereinbefore, the efficiency of a catalyst for simultaneously converting hydrocarbons, carbon monoxide and nitrogen oxides in exhaust gases of internal combustion engines into harmless substances is affected by the proportion of oxidizing components to reducing components of the exhaust gas is represented by the above defined L value. Accordingly a catalyst of this type, in addition to high activity and good durability, should be capable of exhibiting a high conversion rate for each of the pollutants over a wide range of L value, or even when the air/fuel ratio of a combustible mixture fed to the engine is considerably deviated from the stoichiometric ratio. The results in the easing for the provision of a very precise air/fuel ratio control means in treating the exhaust gas of an automotive internal combustion engine. A catalyst according to the invention has also the advantage that the activity of the catalyst is far less affected by a variation in L value than is the conventional catalysts. The excellent properties of a catalyst according to the invention will be illustrated by the examples presented hereinafter.

DETAILED DESCRIPTION

A catalyst according to the invention is produced fundamentally in a similar manner as the production of conventional catalysts which consist of platinum and rhodium applied to a carrier of active alumina but at lower temperatures (maximum 650° C.). Preferably, boric acid is used as the source of boron. Boron, platinum and rhodium are applied to a carrier usually by impregnating or wetting the carrier with an aqueous solution of boric acid, chloroplatinic acid and rhodium trichloride. Alternatively, the carrier may at first be wetted with an aqueous solution of boric acid and thereafter be wetted with an aqueous solution of chloroplatinic acid and rhodium trichloride. The wet carrier is dried at 100°-200° C. and then baked at a higher temperature. The baking is carried out in a stream of hydrogen, air, steam or a mixture of air and steam. Suitable baking temperature ranges are 150°-500° C. in hydrogen, 550°-650° C. in air, 400°-500° C. in 100% steam, and 450°-600° C. in 50% air-50% steam mixture.

EXAMPLE 1

An aqueous solution was prepared by dissolving 0.04 g of boric acid 1.67 g of chloroplatinic acid $H_2PtCl_6.6H_2O$ and 0.57 g of rhodium trichloride $RhCl_3.4H_2O$ in 2 liters of water purified by an ion exchange technique. The pH of this solution was adjusted to 1.90 by the addition of hydrochloric acid.

The application of this solution to a carrier which was made of gamma-alumina and weighed 700 g in all was performed by circulating the solution through a column of the carrier for 1 hr. The temperature of the solution was kept at 40° C., and the superficial velocity of the solution through the column was 4–5 $cm^3/cm^2 \cdot sec$. The wet carrier was dried at 100°-200° C. by means of a hot air drier with stirring until the moisture content became less than 10%. Thereafter the carrier was baked at 500° C. in a stream of 100% steam for 1 hr.

The thus produced catalyst (which will hereinafter be referred to as catalyst A) contained 0.006 Wt% (of the alumina carrier) boron, 0.09 Wt% platinum and 0.03 Wt% rhodium.

REFERENCE

The conventional catalyst R evaluated hereinbefore was produced by the following procedure.

An aqueous solution was prepared by dissolving 1.67 g of chloroplatinic acid and 0.57 g of rhodium trichloride in 2 liters of water purified by an ion exchange technique. The pH of the solution was adjusted to 1.90 by the addition of hydrochloric acid.

This solution was applied to the carrier of Example 1 by the same method as in Example 1. After the drying at 100°-200° C., the carrier was baked at 500° C. in a stream of 100% steam for 1 hr. The thus produced catalyst R contained 0.09 Wt% (of the carrier) platinum and 0.03 Wt% rhodium.

The catalyst A was subjected to the same test as that for the evaluation of the catalyst R under the following set of conditions: L value . . . 1.0, space velocity . . . 55000 $hr^{-1}$, temperature . . . 300° C. The observed conversion rate for HC, CO and NO are presented in the graphs of FIGS. 7, 8 and 9, respectively, with respect to the amount of test hours converted to the distance covered by a motor vehicle. The superiority of the catalyst A to the catalyst R both in the initial activity and the ability of retaining the ability upon exposure to exhaust gases is apparent by comparison between the curves in FIGS. 7–9 and ones in FIGS. 2–4. The catalyst A exhibited a conversion rate above the minimum tolerance level M for each of HC, CO and NO even when the vehicle operation distance amounted to 30000 km.

EXAMPLE 2

This example was generally similar to Example 1 except that 0.4 g of boric acid, 1.67 g of chloroplatinic acid and 0.057 g of rhodium trichloride were dissolved in 2 liters of water. The resultant catalyst (catalyst B) contained 0.06 Wt% (of the carrier) boron, 0.09 Wt% platinum and 0.003 Wt% rhodium.

EXAMPLE 3

Also this example was generally similar to Example 1 except that the baking was carried out at 650° C. in a stream of air for 1 hr. The catalyst according to this example is referred to as catalyst C.

EXAMPLE 4

An aqueous solution prepared by dissolving 0.04 g of boric acid in 2 liters of water purified by an ion exchange technique was applied to 700 g of the carrier employed in Example 1 at 40° C. for 1 hr. The wet carrier was dried to make the moisture content less than 10%.

Another aqueous solution was prepared by dissolving 1.67 g of chloroplatinic acid and 0.57 g of rhodium trichloride in 2 liters of purified water. The pH of this solution was adjusted to 1.90 by adding hydrochloric acid. This solution was applied to the boric acid treated carrier by the procedure according to Example 1. The subsequent drying and baking procedures were the same as in Example 1. The thus produced catalyst (catalyst D) contained 0.006 Wt% (of the carrier) boron, 0.09 Wt% platinum and 0.03 Wt% rhodium.

The activity and durability of the catalysts A,B,C,D and R were evaluated by the hereinbefore described test (L value:1.0, space velocity:55000 $hr^{-1}$, temperature:300° C.). The results are tabulated below in terms of the conversion rate.

| | Initial conversion rate (%) | | | Conversion rate (%) after 16000 km operation | | |
|---|---|---|---|---|---|---|
| | HC | CO | NO | HC | CO | NO |
| Catalyst A | 34.6 | 74.5 | 61.0 | 27.5 | 90.1 | 44.7 |
| Catalyst B | 36.5 | 74.4 | 60.1 | 25.3 | 89.2 | 42.8 |
| Catalyst C | 33.4 | 72.6 | 58.9 | 27.9 | 91.2 | 45.6 |
| Catalyst D | 35.5 | 74.4 | 61.2 | 27.7 | 90.6 | 45.5 |
| Catalyst R | 18.2 | 59.8 | 55.6 | 18.3 | 75.4 | 36.1 |

Figure 10:
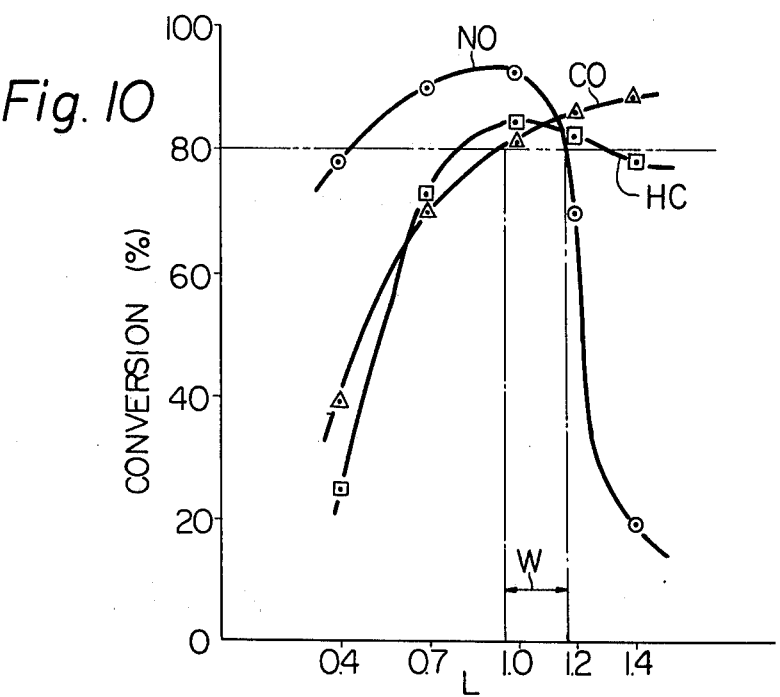
FIG. 10 is a graph showing the dependence of the activity in an engine exhaust gas of the same catalyst according to the invention on the volumetric proportion of oxidizing components to the reducing components of the exhaust gas.
Figure 11:
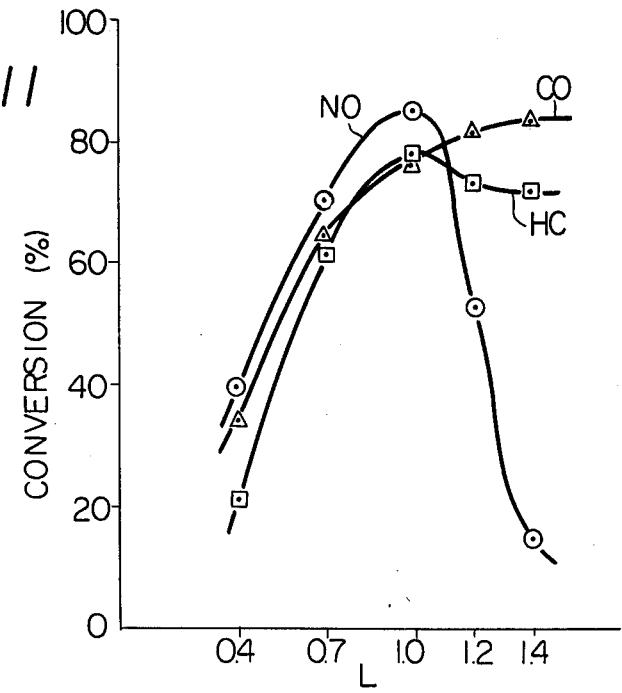
FIG. 11 is a graph similar to the graph of FIG. 10 for a conventional catalyst.

Another series of tests were conducted to examine the influence of L value of the activity of the catalysts A and R under the test conditions described hereinbefore with respect to FIGS. 5 and 6 except that the temperature was 500° C. FIG. 10 shows the result with respect to the catalyst A and FIG. 11 the catalyst R. In FIG. 10, the conversion rate for each of HC, CO and NO is above 80% when L value is within a range indicated at W. A range of L value in which a catalyst exhibits a high conversion rate above a definite value (e.g. 80%) for each of hydrocarbons, carbon monoxide and nitrogen oxides is called "window width". As explained hereinbefore, the window width for a catalyst is desired to be as wide as possible. In the case of FIG. 11, i.e. the catalyst R, no window width is established if 80% conversion is taken as the base line.

Figure 12:
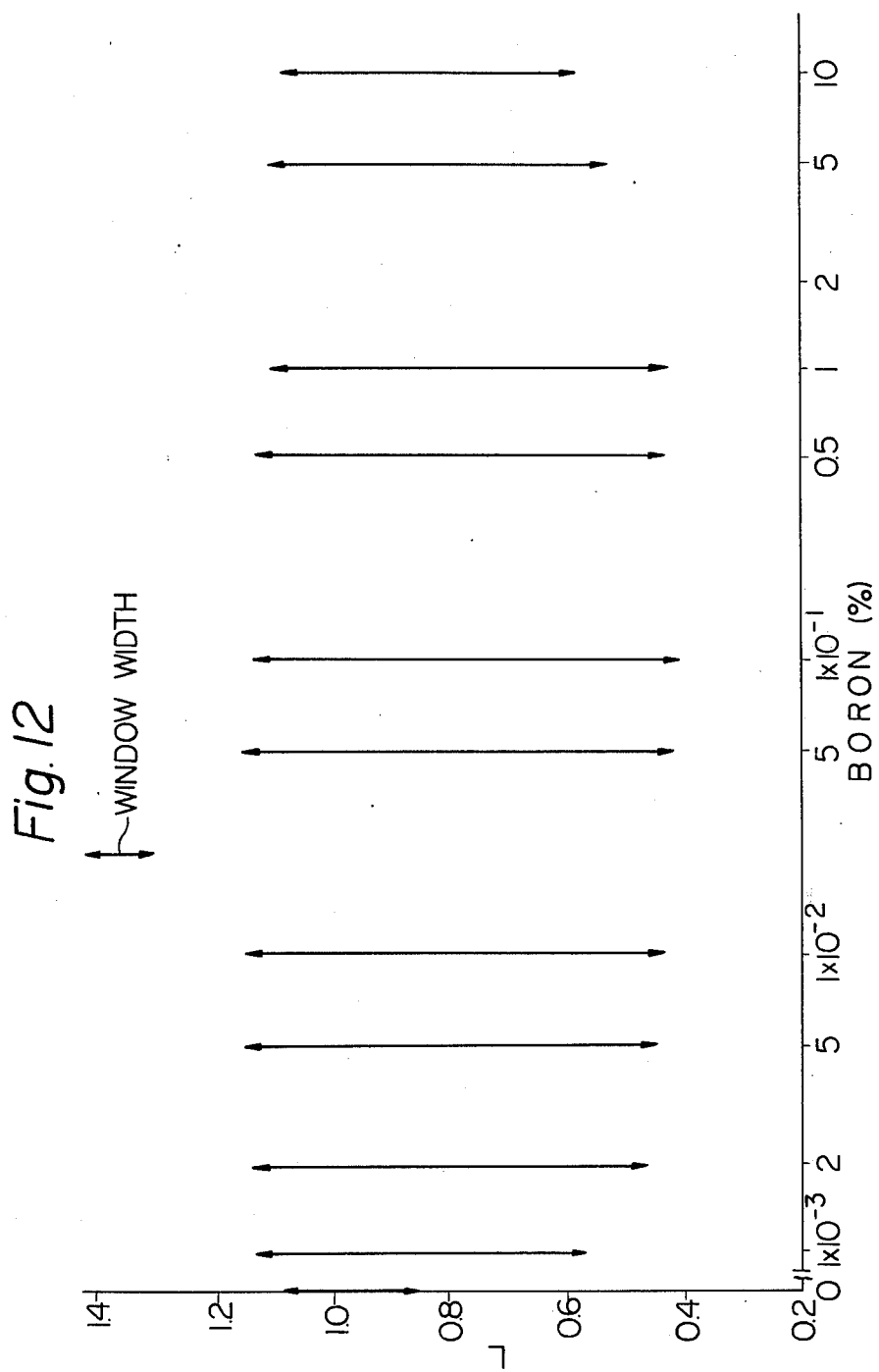
FIG. 12 is a chart showing the relationship between the boron content in a catalyst and a permissible range of the aforementioned volumetric proportion for an effective function of a catalyst.

The chart of FIG. 12 shows the influence of the amount of boron in a catalyst generally according to the invention on the value of the window width. For convenience, this chart was prepared only by examining the relationship between L value and the conversion rate for NO. (As seen in FIGS. 10 and 11, the window width depends most significantly on the conversion rate for NO.) This chart also confirms that the boron content should be within the range from 0.002 to 5 Wt% of the carrier.

What is claimed is:

1. A catalyst for simultaneous oxidation of hydrocarbons and carbon monoxide and reduction of nitrogen oxides in exhaust gas of an internal combustion engine, consisting essentially of a carrier which is made of active alumina at least in a surface portion thereof, 0.05–0.2 Wt% of the carrier of platinum, 0.0015–0.045 Wt% of the carrier of rhodium and 0.002–5 Wt% of the carrier of boron said catalyst being produced by impregnating said carrier with three thermally decomposable compounds of, respectively, platinum, rhodium and boron and then baking the impregnated carrier at temperatures not higher than 650° C.

2. A catalyst as claimed in claim 1, wherein the amount of boron is in the range from 0.002 to 0.5 Wt% of the carrier.

3. The catalyst as claimed in claim 1, wherein said three decomposable compounds are chloroplatinic acid, rhodium trichloride and boric acid, and said baking of the impregnated carrier being performed in a stream of hydrogen at temperatures between 150° and 500° C.

4. A catalyst as claimed in claim 3, wherein the amount of boron is in the range from 0.002 to 0.5 Wt% of said catalyst.

5. A method for the preparation of an anti-pollution catalyst for internal combustion engine exhaust gases which comprises the steps of:
 (a) impregnating an active alumina carrier with a thermally decomposable compound of each of platinum, rhodium and boron in amounts of each to provide upon decomposition, based upon the weight of carrier of 0.05–0.2 wt % of platinum, 0.0015– 0.045 wt % of rhodium and 0.002–5 wt % of boron;
 (b) baking the impregnated carrier at temperatures not higher than 650° C.

6. The method according to claim 5 wherein said baking of the impregnated carrier is performed in a stream of hydrogen at temperatures between 150° and 500° C.

7. The catalyst as claimed in claim 1, wherein said three decomposable compounds are chloroplatinic acid, rhodium tricholoride and boric acid, and said baking of the impregnated carrier being performed in a stream of air at temperatures between 500° and 650° C.

8. A catalyst as claimed in claim 7, wherein the amount of boron is in the range from 0.002 to 0.5 Wt% of said catalyst.

9. The catalyst as claimed in claim 1, wherein said three decomposable compounds are chloroplatinic acid, rhodium tricholoride and boric acid, and said baking of the impregnated carrier being performed in a stream of 100% steam at temperatures between 400° and 550° C.

10. A catalyst as claimed in claim 9, wherein the amount of boron is in the range from 0.002 to 0.5 Wt% of said catalyst.

11. The catalyst as claimed in claim 1, wherein said three decomposable compounds are chloroplatinic acid, rhodium tricholoride and boric acid, and said baking of the impregnated carrier being performed in a stream of a 50/50 mixture of air and steam at temperatures between 450° and 600° C.

12. A catalyst as claimed in claim 11, wherein the amount of boron is in the range from 0.002 to 0.5 Wt% of said catalyst.

13. The method according to claim 5 wherein said baking of the impregnated carrier is performed in a stream of air at temperatures between 500° and 650° C.

14. The method according to claim 5 wherein said baking of the impregnated carrier is performed in a stream of 100% steam at temperatures between 400° and 550° C.

15. The method according to claim 5 wherein said baking of the impregnated carrier is performed in a stream of a 50/50 mixture of air and steam at temperatures between 450° and 600° C.

* * * * *